United States Patent Office 3,546,099
Patented Dec. 8, 1970

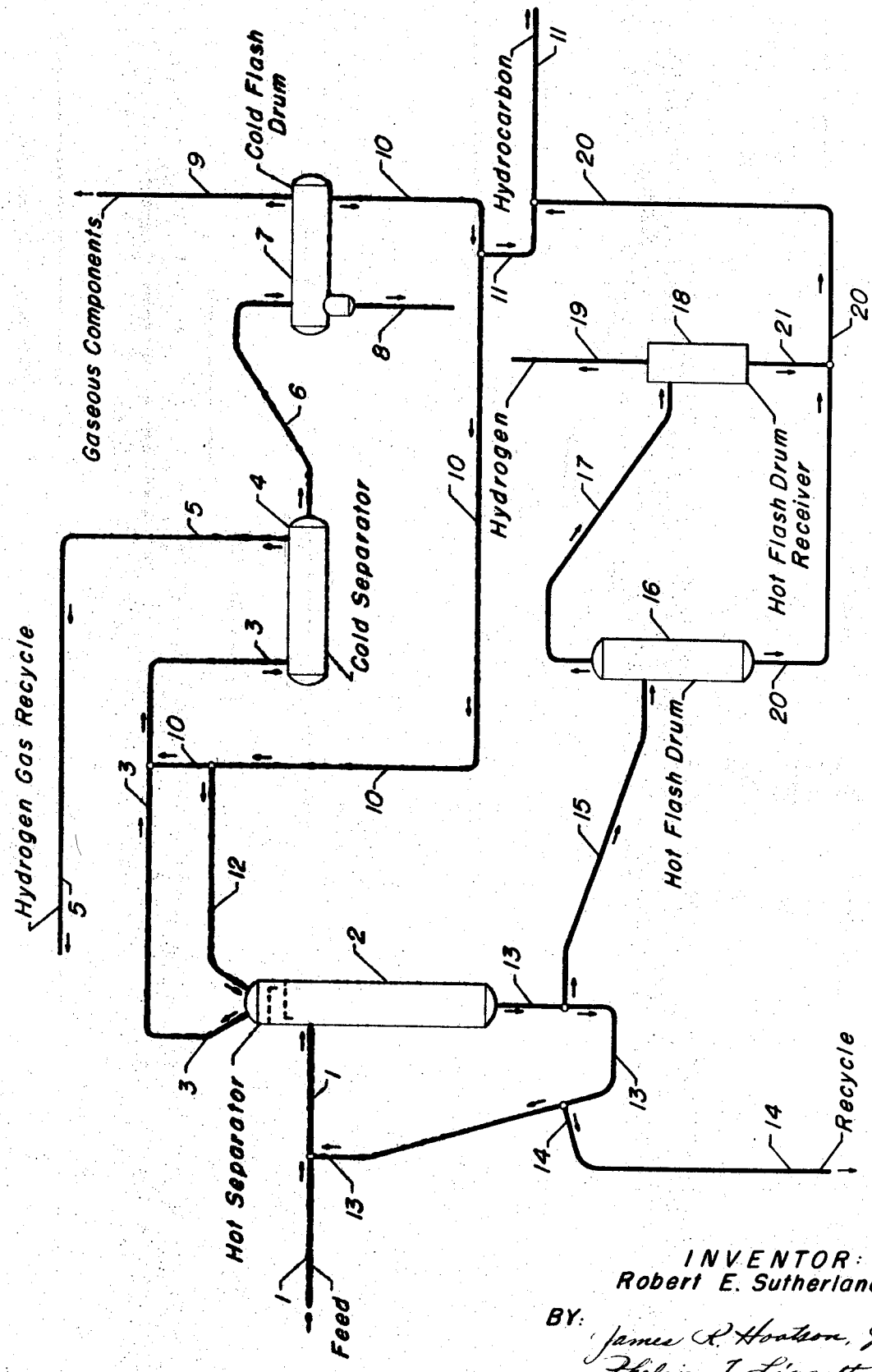

3,546,099
METHOD FOR SEPARATING THE EFFLUENT FROM A HYDROCARBON CONVERSION PROCESS REACTION ZONE
Robert E. Sutherland, Chicago, Ill., assignor to Universal Oil Products Company, Des Plaines, Ill., a corporation of Delaware
Filed Feb. 26, 1969, Ser. No. 802,425
Int. Cl. B01d 3/06
U.S. Cl. 208—102                 8 Claims

ABSTRACT OF THE DISCLOSURE

The effluent from a hydrocarbon conversion process reaction zone is separated into selected fractions utilizing an enrichment stream recycle technique.

BACKGROUND OF THE INVENTION

This invention relates to a separation technique. It further relates to a method for separating the effluent from a hydrocarbon conversion process reaction zone. It particularly relates to a method for separating the effluent from a catalytic hydroprocessing process reaction zone.

By the term "catalytic hydroprocessing" I mean to include any processing of a petroleum fraction under elevated hydrogen pressure involving a consumption of hydrogen by the petroleum fraction. This naturally includes hydrocracking, hydrotreating, and hydrorefining or hydropurification.

This invention is especially applicable to the separation of an effluent from a catalytic hydroprocessing process reaction zone wherein a petroleum crude oil feedstock is charged to the reaction zone. By the term "petroleum crude oil feedstock" is meant to include any oils extracted from tar sands, topped or reduced crudes, vacuum residuum (vacuum tower bottoms products) and those petroleum crude oils referred to as "black oils" which contain a significant quantity of asphaltic material and high concentrations of sulfur, as well as large quantities of nitrogenous compounds and high molecular weight organometallic complexes principally comprising nickel and vanadium. These "black oils" include those hydrocarbon charge stocks of which at least about 10% by volume boils above a temperature of about 1050° F. These black oils usually have an API gravity, at 60° F., of less than 20.0 and further, sulfur concentrations are usually more than 1% by weight and often in excess of 3% by weight.

In typical prior art hydrocarbon conversion process reaction zones, and particularly in catalytic hydroprocessing process reaction zones, when utilizing a petroleum crude oil feedstock, as defined above, a heavy black oil emulsion tends to form in the cold separator zone. However, I have found by the method of my invention, that I can substantially eliminate the formation of the emulsion in this zone which naturally made the process not as efficient as it should have been.

SUMMARY OF THE INVENTION

It is an object of this invention to provide a method for separating the effluent from a hydrocarbon conversion process reaction zone.

It is a specific object of this invention to provide a method for separating the effluent from a catalytic hydroprocessing process reaction zone in a more facile and economical manner which also makes the process more efficient.

Therefore, the present invention provides a method for separating the effluent from a hydrocarbon conversion process reaction zone which comprises the steps of: (a) passing the effluent from said reaction zone into a first separation zone maintained under separation conditions wherein said effluent is separated into a hydrogen-rich gaseous fraction and a hydrocarbon-rich liquid fraction; (b) introducing said hydrogen-rich gaseous fraction into a second separation zone wherein said fraction is separated into hydrogen and an enrichment stream comprising normally gaseous components, normally gaseous hydrocarbons, and normally liquid hydrocarbons; (c) passing a first portion of said enrichment stream into a fractionation zone, the second portion of said stream into said first separation zone, and the remaining portion of said stream into said second separation zone; (d) passing said hydrocarbon-rich fraction of Step (a) into a flash zone wherein said fraction is separated into a hydrogen fraction and a normally liquid hydrocarbon fraction; and, (e) separately recovering hydrogen, normally gaseous components, normally gaseous hydrocarbons, and normally liquid hydrocarbons from the process.

As will be described hereinafter in greater detail, the essence of my invention encompasses an enrichment stream recycle technique utilizing the hot separator zone, the cold separator zone, and a fractionation zone.

The description of the present invention shall be limited to the processing scheme for handling the effluent from a catalytic hydroprocessing process reaction zone although the scope of the invention is not necessarily limited thereto. The effluent is prepared by means known to those skilled in the art, and generally comprises the passing of a petroleum crude oil feedstock to a conventional catalytic hydroprocessing process reaction zone containing a catalytic hydroprocessing catalyst. At the end of the residence time in the catalytic hydroprocessing process reaction zone, the total effluent from the reaction zone is generally removed and passed into separation means in accordance with the method of this invention.

My invention can be most clearly described and illustrated with reference to the attached drawing which is a schematic representation of one specific embodiment of this invention.

DESCRIPTION OF THE DRAWING

Referring now to the drawing, an effluent from a catalytic hydroprocessing process reaction zone is passed via line 1 as feed to hot separator 2. It is preferred that the effluent be charged into an intermediate portion of the hot separation zone which may contain trays, baffles, and the like. It is particularly preferred within the method of my invention that the hot separator vessel contain at least two trays, located in an upper portion of the hot separator above the feed inlet to this hot separator zone. The hot separator is usually maintained at substantially the same pressure imposed upon the catalytic hydroprocessing zone which is usually in the range of from at least about 1000 p.s.i.g. and preferably in the range of from about 1000 to 4000 p.s.i.g. The hot separation zone is maintained usually at a temperature from about 650° F. to about 800° F. In hot separator 2, the effluent from the catalytic hydroprocessing process reaction zone is separated into a hydrogen-rich gaseous fraction and hydrocarbon-rich fraction.

The hydrogen-rich gaseous fraction is then passed via line 3 into cold separation zone 4 wherein the fraction is separated into hydrogen and an enrichment stream comprising normally gaseous components, normally gaseous hydrocarbons, and normally liquid hydrocarbons. The cold separation zone is usually maintained at a temperature below about 700° F. and preferably in the range of from about 0° F. to about 150° F. and is maintained at substantially the same operating pressure as the catalytic hydroprocessing process reaction zone. Hydrogen gas for recycle to the catalytic hydroprocessing process may be removed from cold separator 4 via line 5. The enrichment stream comprising normally gaseous components, normally gaseous hydrocarbons, and normally liquid hydrocarbons passes from cold separator 4 via line 6 into cold flash drum 7 wherein at least a portion of the normally gaseous components, including hydrogen sulfide and ammonia, are removed from said enrichment stream. In the drawing, the gaseous components are represented as leaving the process via line 9. If desired, heavy components may be removed via line 8 from cold flash drum 7. The enrichment stream, now comprising normally gaseous components such as hydrogen sulfide, normally gaseous hydrocarbons, and normally liquid hydrocarbons passes from cold flash drum 7 via line 10 so that a first portion of the enrichment stream passes via lines 10 and 11 into a fractionation zone (not shown) and a second portion of the enrichment stream passes via lines 10 and 3 into the cold separation zone 4, while the remaining portion of the enrichment stream passes via lines 10 and 12 into an upper portion of the hot separator 2.

The hydrocarbon-rich fraction separated from the hydrogen-rich gaseous fraction passes from hot separator 2 via lines 13 and 15 into hot flash drum 16 wherein the fraction is separated into a hydorgen fraction and a normally liquid hydrocarbon fraction. In a preferred embodiment, at least a portion of the hydrocarbon-rich fraction via line 13 is recycled to the catalytic hydroprocessing reaction zone via lines 13 and 14 and a second portion of the fraction is recycled to commingle with the effluent from the catalytic hydroprocessing reaction zone in line 1 prior to passing as feed into the hot separation zone.

The flash zones utilized in my method are usually referred to as a cold flash system and a hot flash system. As described above, the cold flash system follows the cold separator and is maintained at substantially reduced pressure usually in the range of from about subatmospheric to 1000 p.s.i.g. and preferably from about atmospheric pressure to 200 p.s.i.g. The hot flash system is usually maintained at higher pressure than the cold flash system described above. It is particularly preferred that the hot flash zone be maintained at a pressure of less than 300 p.s.i.g. and preferably in the range of from about atmospheric pressure to about 300 p.s.i.g.

In a particularly preferred embodiment, the hydrogen fraction recovered from hot flash drum 16 passes via line 17 into a hot flash drum receiver wherein substantially pure hydrogen of at least 80% purity is further separated from the normally liquid hydrocarbons. The high purity hydrogen then passes from the process via line 19 wherein it can be passed to other conversion units or be utilized for recycle to the catalytic hydroprocessing reaction zone by means of compression zones and the like. The normally liquid hydrocarbon passes via lines 20 and 21 from hot flash drum 16 and hot flash drum receiver 18, respectively, and is admixed in line 20 for passage to a fractionation zone (not shown). In another preferred embodiment, the admixed normally liquid hydrocarbon fractions via lines 20 and 21 are admixed prior to fractionation with that portion of the enrichment stream described above passing via line 11 into the fractionation zone.

PREFERRED EMBODIMENT

In a particularly preferred embodiment of this invention, this invention provides a method for separating the effluent from a catalytic hydroprocessing process reaction zone which comprises the steps of: (a) passing the effluent from said reaction zone into an intermediate portion of a hot separation zone maintained under separation conditions wherein said effluent is separated into a hydrogen-rich gaseous fraction and a hydrocarbon-rich fraction; (b) introducing said hydrogen-rich gaseous fraction into a cold separation zone wherein said fraction is separated into hydrogen and an enrichment stream comprising normally gaseous components, normally gaseous hydrocarbons, and normally liquid hydrocarbons; (c) introducing said enrichment stream into a cold flash zone wherein at least a portion of said normally gaseous components are removed from said enrichment stream; (d) passing a first portion of said enrichment stream of Step (c) to a fractionation zone, the second portion of said stream into said cold separation zone, and the remaining portion of said stream into an upper portion of said hot separation zone; (e) passing said hydrogen-rich fraction of Step (a) into a hot flash zone wherein said fraction is separated into a hydrogen fraction and a normally liquid hydrocarbon fraction; and, (f) separately recovering hydrogen, normally gaseous components, normally gaseous hydrocarbons, and normally liquid hydrocarbons from the process.

Thus, it is apparent that the present invention provides a method for separating the effluent from a catalytic hydroprocessing process reaction zone utilizing an interrelated and interdependent series of processing steps to accomplish the separation in a manner utilizing all of the various process streams in the process.

It is apparent that by the method of my invention, the enrichment stream described above passing to an upper portion of the hot separation zone countercurrently cools and washes the feed material passing into an intermediate portion of the zone and the heavy black oil emulsion that would normally form in the cold separation zone is eliminated with no loss of valuable conversion products and with the added benefit of a high purity hydrogen gas being recovered from the process.

I claim as my invention:
1. A method for separating the effluent from a hydrocarbon conversion process reaction zone which comprises the steps of:
   (a) passing the effluent from said reaction zone into a first separation zone maintained under separation conditions wherein said effluent is separated into a hydrogen-rich gaseous fraction and a hydrocarbon-rich fraction;
   (b) introducing said hydrogen-rich gaseous fraction into a second separation zone wherein said fraction is separated into hydrogen and an enrichment stream comprising normally gaseous components, normally gaseous hydrocarbons, and normally liquid hydrocarbons;
   (c) passing a first portion of said enrichment stream into a fractionation zone, a second portion of said stream into said first separation zone, and the remaining portion of said stream into said second separation zone;
   (d) passing said hydrocarbon-rich fraction of Step (a) into a flash zone wherein said fraction is separated into a hydrogen fraction and a normally liquid hydrocarbon fraction; and,
   (e) separately recovering hydrogen, normally gaseous components, normally gaseous hydrocarbons, and normally liquid hydrocarbons from the process.

2. A method for separating the effluent from a catalytic hydroprocessing process reaction zone which comprises the steps of:
   (a) passing the effluent from said reaction zone into an intermediate portion of a hot separation zone maintained under separation conditions wherein said effluent is separated into a hydrogen-rich gaseous fraction and a hydrocarbon-rich fraction;
   (b) introducing said hydrogen-rich gaseous fraction into a cold separation zone wherein said fraction is separated into hydrogen and an enrichment stream comprising normally gaseous components, normally gaseous hydrocarbons, and normally liquid hydrocarbons;
   (c) introducing said enrichment stream into a cold flash zone wherein at least a portion of said normally gaseous components are removed from said enrichment stream;
   (d) passing a first portion of said enrichment stream of Step (c) inso a fractionation zone, a second portion of said stream into said cold separation zone, and the remaining portion of said stream into an upper portion of said hot separation zone;

(e) passing said hydrocarbon-rich fraction of Step (a) into a hot flash zone wherein said fraction is separated into a hydrogen fraction and a normally liquid hydrocarbon fraction; and, (f) separately recovering hydrogen, normally gaseous components, normally gaseous hydrocarbons, and normally liquid hydrocarbons from the process.

3. The method according to claim 2 wherein at least a portion of the hydrocarbon-rich fraction of Step (a) is recycled to the catalytic hydroprocessing process reaction zone.

4. The method according to claim 2 wherein at least a portion of the hydrocarbon-rich fraction of Step (a) is recycled to the hot separation zone.

5. The method according to claim 2 wherein at least a portion of the hydrocarbon-rich fraction of Step (a) is recycled to the catalytic hydroprocessing reaction zone and wherein at least a second portion of said fraction is recycled to commingle with the effluent from said catalytic hydroprocessing reaction zone prior to passing as feed into said hot separation zone.

6. The method according to claim 2 wherein said enrichment liquid of Step (d) countercurrently contacts the feed passing into said hot separation zone.

7. The method according to claim 2 wherein the hydrogen fraction of Step (e) is passed into a hot flash drum receiver wherein substantially pure hydrogen is further separated from normally liquid hydrocarbons.

8. The method according to claim 5 wherein said normally liquid hydrocarbon is admixed with said normally liquid hydrocarbon fraction of Step (e) and then admixed with that portion of the enrichment stream of Step (d) passing into said fractionation zone.

References Cited
UNITED STATES PATENTS

| | | | |
|---|---|---|---|
| 2,952,616 | 9/1960 | Hausch | 208—105 |
| 3,371,029 | 2/1968 | Weiland | 208—102 |
| 3,371,030 | 2/1968 | Penisten et al. | 208—102 |
| 3,402,122 | 9/1968 | Atwater et al. | 208—102 |
| 3,481,859 | 12/1969 | De Graff | 208—103 |

HERBERT LEVINE, Primary Examiner

U.S. Cl. X.R.
208—103, 104, 105